June 14, 1927.

G. B. COLEMAN

AUTOMATIC TRANSMISSION

Filed Feb. 2, 1925

1,632,694

2 Sheets-Sheet 1

Inventor
GEORGE B. COLEMAN
By
Attorney

June 14, 1927.

G. B. COLEMAN

AUTOMATIC TRANSMISSION

Filed Feb. 2, 1925

1,632,694

2 Sheets-Sheet 2

Inventor
GEORGE B. COLEMAN

Patented June 14, 1927.

1,632,694

UNITED STATES PATENT OFFICE.

GEORGE B. COLEMAN, OF DAYTON, OHIO, ASSIGNOR TO COLEMAN AUTOMATIC TRANSMISSION COMPANY, OF SAN FRANCISCO, CALIFORNIA, A CORPORATION OF CALIFORNIA.

AUTOMATIC TRANSMISSION.

Application filed February 2, 1925. Serial No. 6,394.

The purpose of the invention is to provide a transmission mechanism having driving and driven elements in which an inverse variation in ratio of the torque and speed may take place in the driven member with a consequent torque and speed for the driving member, so that the load to be moved by the driven member may be started at low speed and with an increased torque without undue strain on the prime mover connected with the driving member; to provide a mechanism of this character in which, as the inertia of the load is overcome, speed of the driven element may be attained to gradually bring the load up to the speed of the driving element and the prime mover connected therewith; and to provide a transmission mechanism having these automatic features wherein the number of parts may be reduced to a minimum, the construction thereof may be of simple character, the mechanism thereof cheaply produced and marketed at a low cost.

Figure 1:
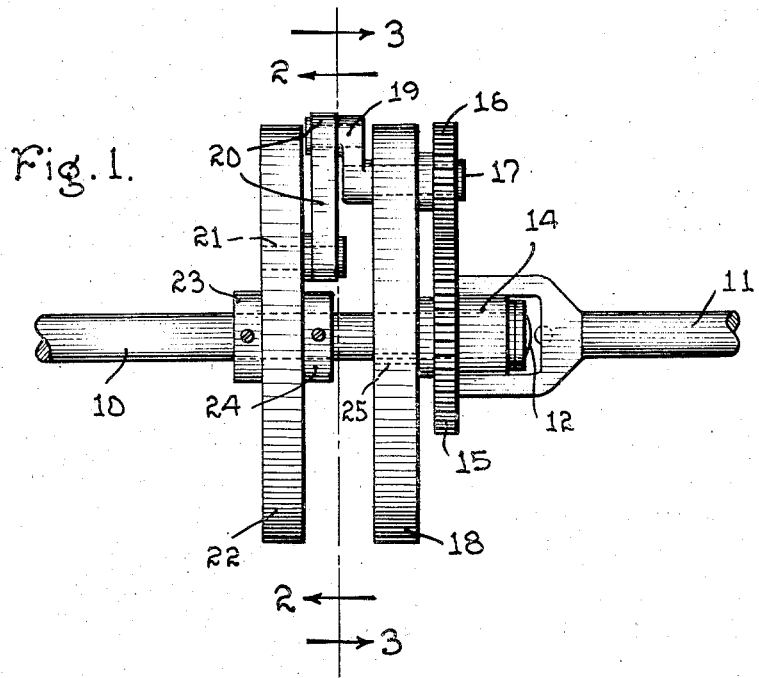

With this purpose in view, the invention consists in a construction and combination of parts of which a preferred embodiment is illustrated in the accompanying drawings, wherein:

Figure 1 is a side elevational view of the invention.

Figure 2:
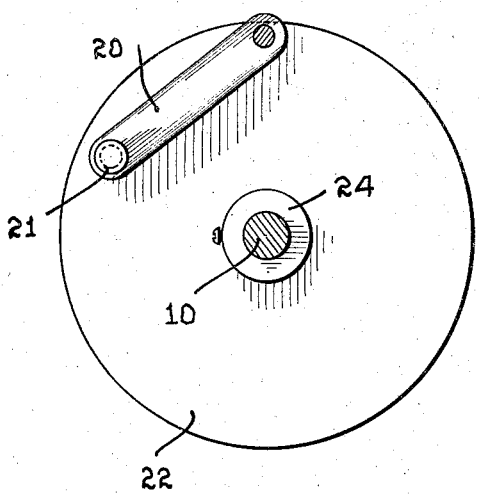
Figure 3:
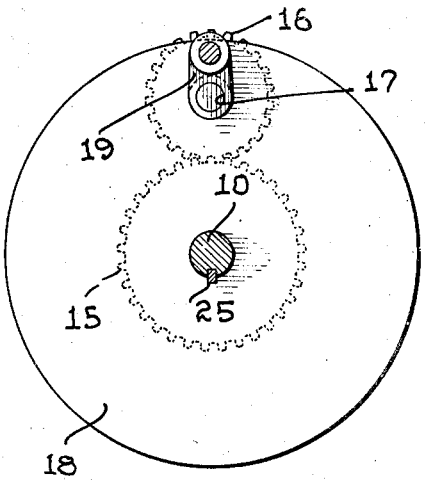

Figures 2 and 3 are transverse sectional views on the planes indicated by the lines 2—2 and 3—3 of Figure 1.

Figure 4:
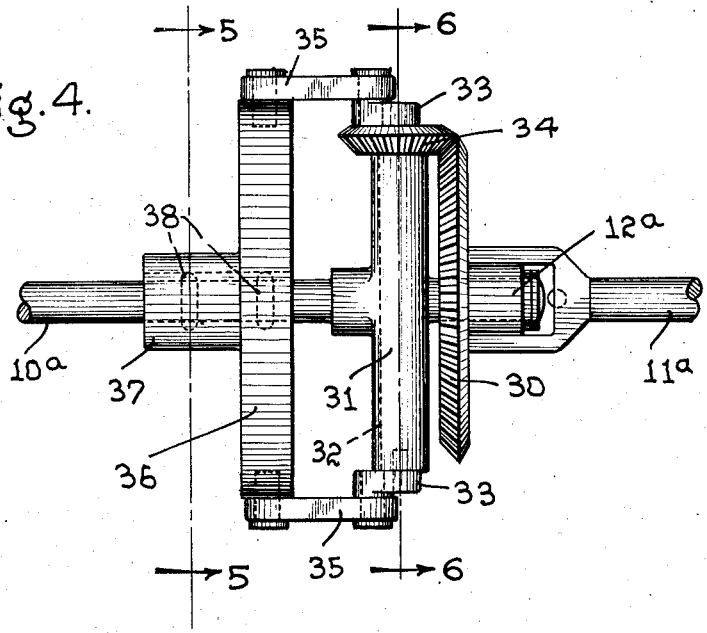

Figure 4 is an elevational view of a modified form.

Figure 5:
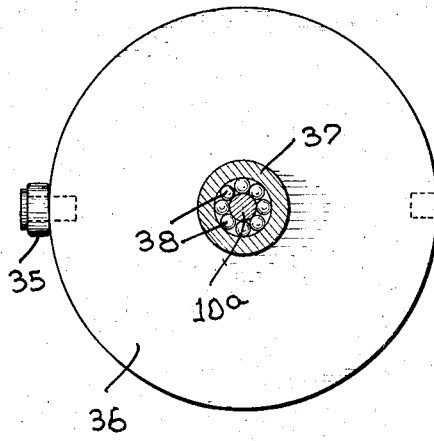
Figure 6:
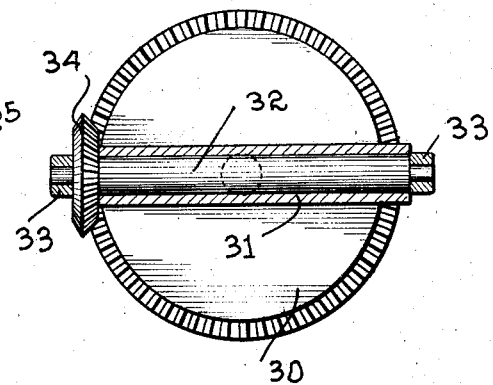

Figures 5 and 6 are transverse sectional views on the planes indicated by the lines 5—5 and 6—6 of Figure 4.

The driving and driven shafts 10 and 11, which are designed respectively for connection to a prime mover and to the load to be moved, whether the latter be of a stationary character or the traction type such as a car or vehicle, are axially aligned and preferably the driving shaft is loosely coupled to the driven shaft by having its extremity 12 journaled in a cup bearing 14 at the extremity of the driven shaft. Carried by the driven shaft and secured to the cup 14 in any acceptable manner is a spur gear 15 in mesh with which is a pinion 16, the latter being carried on a short shaft 17 rotatably mounted in a disk 18 adjacent the periphery of the latter.

On that face opposite that on which the spur gear 15 is mounted, the shaft 17 carries a crank 19, the latter being connected by a link 20 with a pin 21 carried by and disposed adjacent the periphery of a second disk 22, the latter being preferably peripherally weighted to function as a fly wheel. The fly wheel 22 is loosely mounted on the drive shaft 10 for angular movement relative thereto but is precluded from longitudinal movement on said shaft by the collars 23 and 24 secured to the shaft on opposite sides of the fly wheel. The disk 18 supporting the shaft 17 and its spur gear 16 and crank 19 is secured to the drive shaft to turn at the same angular speed of the same, being preferably keyed to the latter, as indicated at 25.

The prime mover or motor being connected to the drive shaft 10, when the former is started, the drive shaft takes up the speed of the latter and the disk 18 therefore moves in synchronism with it. The load connected to the driven shaft 11, however, resists any turning movement imparted to this shaft. As soon as the drive shaft starts to rotate, however, the disk 18 will rotate and therefore the pinion 16 will traverse the periphery of the spur gear 15 resulting in the rotation of the former and therefore the rotation of the crank 19 which, because of the link connection 20, will immediately start to oscillate the fly wheel 22. If the load remains stationary, the spur gear 15 will remain stationary and under these conditions the fly wheel 22 will oscillate very rapidly, the inertia of the fly wheel resisting this constant change of direction, with the result of imposing on the pinion 16 a resistance to its continued rotation. This condition will result in turning movement being imparted to the spur gear 15 and the consequent turning of the driven shaft 11 and the movement of the load which, as the speed of the latter increases, will reduce the angular speed of the spur gear 15 and consequently the oscillatory periods of the fly wheel 19. The gradual acceleration of the speed of the load up to the speed of the drive shaft will result in the gradual reduction of the oscillatory periods of the fly wheel with the final cessation of such oscillation when the driving and driven shafts are running in synchronism, at which time there will be no angular movement of the pinion 16 on its own axis.

At this point, the centrifugal force will tend to swing the crank 19 outwardly and to keep it in that position and thus maintain the driving and driven shafts at the same speed.

Obviously, when the load increases as in the case of a vehicle ascending a hill, the speed of the drive shaft may remain constant, the fly wheel beginning to oscillate as the load increases because of the resistance to turning movement of the spur gear 15 with consequent rotation of the pinion 16 on its own axis.

In the modification shown in Figure 4, the same principles of operation are involved. The driving and driven shafts 10$^a$ and 11$^a$ are coupled in substantially the same manner, as indicated at 12$^a$, but the driven shaft in this construction is provided with a bevel gear 30 while the drive shaft is provided with a cross head 31 in which is journaled a transverse shaft 32, the latter being provided with terminal cranks 33 and at one end with a bevel pinion 34 meshing with the bevel gear 30. The cranks 33 in this construction are disposed on diametrically opposite sides of the drive shaft 10$^a$ and are connected by links 35 with an oscillatory head 36 which is preferably of circular form but provided with a hub 37, the hub and disk being bored for the reception of the drive shaft 10$^a$ and anti-friction bearings, such as those indicated at 38, being carried in the bore to permit free axial movement of the head along the drive shaft.

In this construction, the oscillatory movement takes place axially of the shaft and not transversely thereof as in the other form. Unless the driving and driven shafts 10$^a$ and 11$^a$ be moving at the same speed, the pinion 34 will perforce rotate on its own axis with a consequent rotation of the cranks 33 and resultant oscillation of the head 36 axially of the drive shaft, these oscillations being greatest when the driven shaft is at rest and the inertia of the head tending to resist this continual change of movement will result in starting the driven shaft and its load until finally the latter will be brought up to the speed of the drive shaft, thus bringing to rest the rotation of the pinion 34 on its axis with the cessation of oscillatory movement imparted to the head 36.

The invention having been described, what is claimed as new and useful is:

A transmission comprising axially aligned driving and driven shafts loosely coupled at their adjacent ends, a cross-head mounted upon and secured to the driving shaft, a bevel gear secured to the driven shaft, a transversely disposed shaft journaled in said cross-head and provided with terminal cranks disposed at opposite ends of the latter, a bevel gear couple operatively connecting the transverse shaft and driven shaft, an inert member mounted upon and movable axially of one of the aligned shafts, and link connections between said cranks and said inert member.

In testimony whereof he affixes his signature.

GEORGE B. COLEMAN.